(12) United States Patent
Jaeker et al.

(10) Patent No.: US 8,575,486 B2
(45) Date of Patent: Nov. 5, 2013

(54) GUIDE CONDUIT

(75) Inventors: Thilo-Alexander Jaeker, An den Drei Eichen (DE); Harald Nehring, Heckenweg (DE)

(73) Assignee: Igus GmbH, Cologne (DE)

( * ) Notice: Subject to any disclaimer, the term of this patent is extended or adjusted under 35 U.S.C. 154(b) by 39 days.

(21) Appl. No.: 13/264,881

(22) PCT Filed: Apr. 15, 2010

(86) PCT No.: PCT/EP2010/054984
§ 371 (c)(1),
(2), (4) Date: Jan. 3, 2012

(87) PCT Pub. No.: WO2010/119106
PCT Pub. Date: Oct. 21, 2010

(65) Prior Publication Data
US 2012/0090870 A1    Apr. 19, 2012

(30) Foreign Application Priority Data

Apr. 16, 2009    (DE) .................. 20 2009 005 547

(51) Int. Cl.
*H02G 3/04*    (2006.01)

(52) U.S. Cl.
USPC ...... 174/68.3; 174/68.1; 174/72 A; 174/70 C; 248/49; 248/68.1

(58) Field of Classification Search
USPC ...... 174/68.1, 68.3, 72 A, 72 R, 788 R, 70 C, 174/95, 99 R, 101, 96, 60, 88 R; 52/220.1, 52/220.3, 220.5, 220.7; 439/207, 210, 439/212; 248/200, 49, 68.1
See application file for complete search history.

(56) References Cited

U.S. PATENT DOCUMENTS

| 3,994,373 | A | | 11/1976 | Loos et al. |
| 4,129,277 | A | | 12/1978 | Tenniswood |
| 5,134,251 | A | * | 7/1992 | Martin .................. 138/110 |
| 6,107,565 | A | * | 8/2000 | O'Rourke ............ 174/101 |
| 6,781,058 | B1 | * | 8/2004 | DeCicco et al. ....... 174/72 A |
| 7,576,283 | B2 | * | 8/2009 | Kadrnoska et al. ..... 174/70 C |

FOREIGN PATENT DOCUMENTS

| DE | 3525332 | 1/1987 |
| DE | 202007005478 | 8/2007 |
| WO | 2006066812 | 6/2006 |

OTHER PUBLICATIONS

German Search Report dated Dec. 9, 2009, received in corresponding German Application No. 20 2009 005 547.7, 4 pgs.
PCT International Search Report dated Apr. 27, 2011, received in corresponding PCT Application No. PCT/EP10154984, 6 pgs.
English Translation of the PCT International Preliminary Report on Patentability dated Oct. 18, 2011, received in corresponding PCT Application No. PCT/EP10154984, 7 pgs.

* cited by examiner

*Primary Examiner* — Angel R Estrada
(74) *Attorney, Agent, or Firm* — Grossman Tucker Perreault & Pfleger, PLLC

(57) ABSTRACT

The invention relates to a guide conduit for a cable receptacle with a support device for the upper strand, and is designed so that the support device has an essentially flat running surface on the top side of a body which is movable solely by gravity and/or by the elastic force thereof from one position, in which the support device does not protrude significantly over the inner lateral surface of the guide conduit, to a position in which the body opposite the lateral wall protrudes into the interior of the guide conduit, and to the final position, in which the support device extends through an opening in the respective lateral wall of the guide conduit.

17 Claims, 4 Drawing Sheets

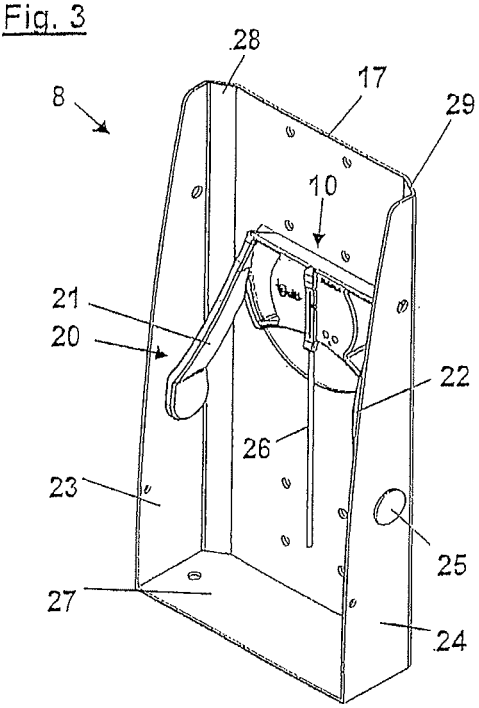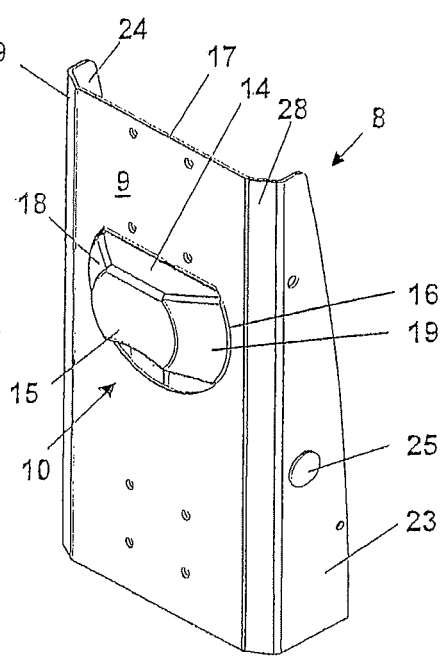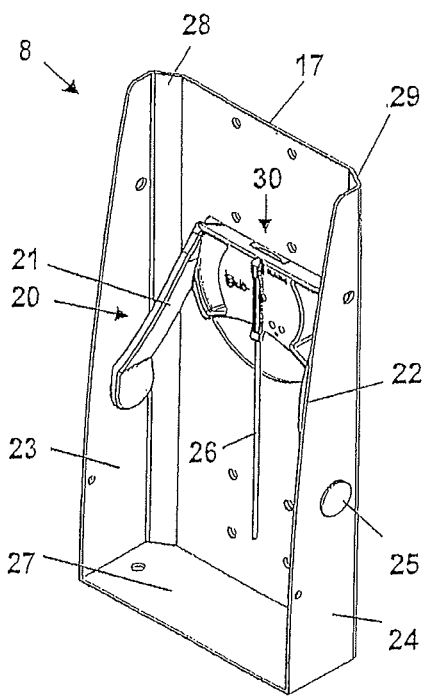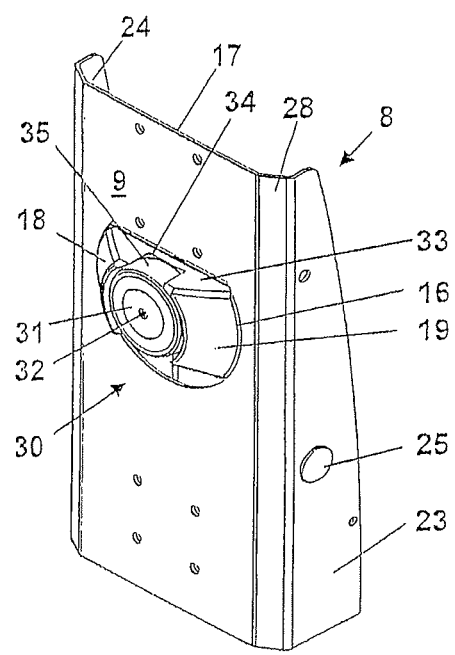

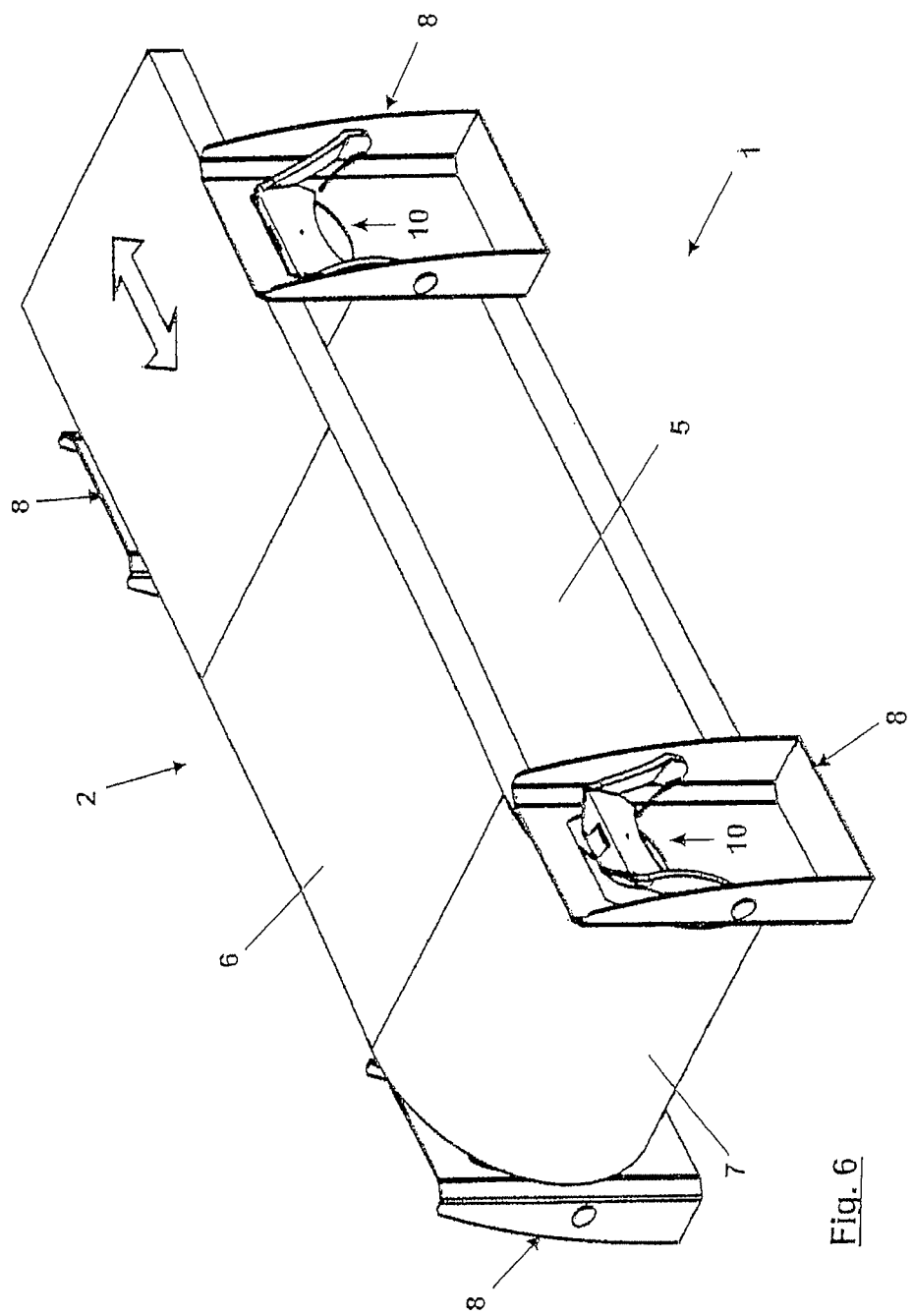

Figure 1:
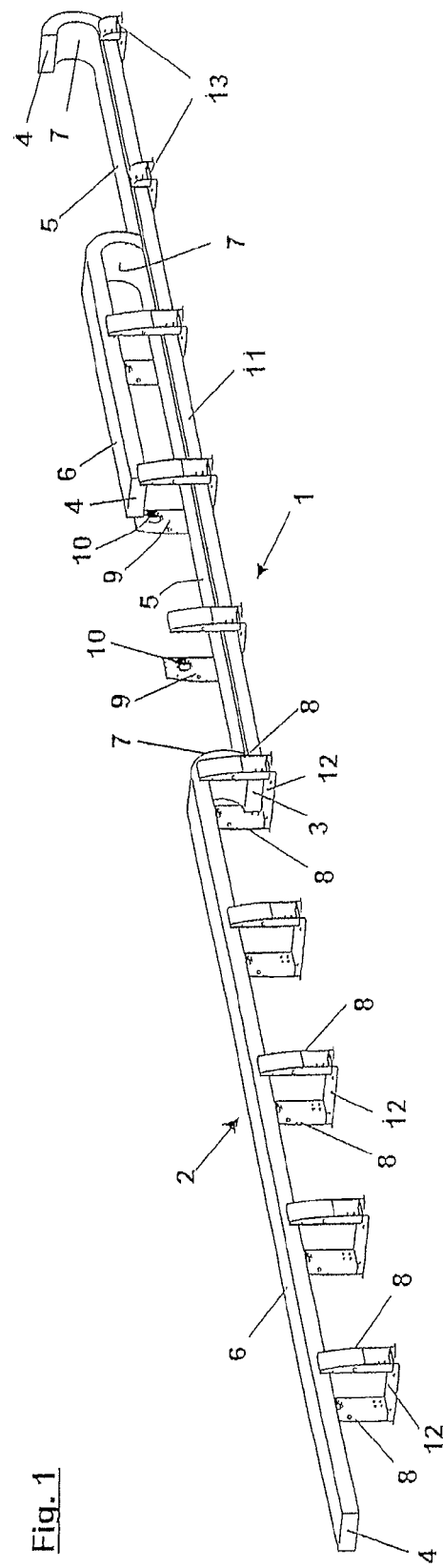

ial stage
GUIDE CONDUIT

CROSS-REFERENCE TO RELATED APPLICATIONS

This application is a United States 371 national stage completion of international application no. PCT/EP2010/054984 filed Apr. 15, 2010 (published as WO 2010/119106 A2 on Oct. 21, 2010) designating the U.S., and which claims priority to German patent application no. DE 20 2009 005 547.7, filed Apr. 16, 2009, the teachings of which are incorporated by reference.

FIELD

The invention relates to a guide conduit for a cable receptacle which extends between a stationary and a movable connecting point and consists of a lower strand that can be connected to the stationary connecting point and an upper strand that can be connected to the movable connecting point, said strands being connected to each other by a redirection bow, the guide conduit including two opposite vertically fixed lateral walls with inner lateral surfaces for the contact with lateral parts of the two strands, and at least one support device on each of the opposite lateral walls for supporting and guiding the upper strand and movable between a first position in which it protrudes into the interior of the guide conduit with respect to the lateral wall and acts as a support of the upper strand, and a second position in which it does not protrude significantly over the inner lateral surface of the respective lateral wall and does not act as a support of the upper strand, and the guide conduit including a switching device that can be moved into the path of travel of the cable receptacle and is provided in the form of a body which is pivotably supported on a pivot arm outside of the inner lateral surface of the respective lateral wall and is enlarged outwardly from the interior of the guide conduit on its two sides pointing in the longitudinal direction of the guide conduit and can be moved by the contact of these sides with inner and outer regions of the redirection bow of the cable receptacle to a position in which it does not significantly protrude over the inner lateral surface of the respective lateral wall and in which it does not impede the continued travel of the cable receptacle, and is coupled to the support device in such a manner that the same is movable from one of the two positions to the other.

BACKGROUND

Cable receptacles intended to be guided by such a guide conduit can for example be energy chains for receiving cables, hoses or flexible tubes in which adjacent members are articulated to each other, band chains in which the members are interconnected by a flexible band, or other cable receiving devices which are bowable in at least one plane.

Such guide conduits are known in various designs. In the case of longer travel distances, they are used in the horizontal or vertical direction. In horizontal travelling, they support a smooth and low-friction travel of the cable receptacle. To this end, the lower strand that is connected to the stationary connecting point is supported on the floor or on carrying rails of the guide conduit. The lateral walls of the guide conduit are arranged with little play with respect to the side members of the cable receptacle so that the same can be moved along an accurately linear travel path. After a shorter or longer self-supporting travel immediately after the redirection bow, the upper strand is usually supported the lower strand to be guided thereon in a sliding manner.

If the upper strand shall not be supported on the lower strand, e.g. if accumulating dirt or chips cause wear and tear during the sliding movement, the upper strand must be supported and also laterally guided by a guide conduit, especially at longer travel distances. A guide conduit which is suitable for this purpose is the subject of the present invention.

The term guide conduit is understood to be not only a continuous conduit which is closed laterally or at the bottom. The device is assumed to be one which supports or holds up the cable receptacle in at least two mutually vertically running directions transversely to the longitudinal direction of the cable guiding device. Accordingly, supporting or holding can also be provided in spaced-apart regions in the longitudinal direction of the cable receptacle so that the guide conduit can be open or discontinuous between these regions.

Known guide conduits for supporting an upper strand which is guided with a vertical distance from the lower strand involve much time and effort, since the upper strand has to be supported not only laterally but also on its lower side, and the support of the lower side must be carried out in such a manner that the passage of the redirection bow is not affected during the reciprocating movement of the cable receptacle. In addition, the support leads to an undesired high sliding friction.

A guide conduit of the above-described kind is known from DE 20 2007 005 478 U1. In this conduit, the support device and the switching device are designed as protrusions on the opposite legs of a rocker, said protrusions of the rocker alternately protruding over the inner lateral surface of the respective lateral wall into the interior of the guide conduit. The protrusions are formed as hemispheres pointing in the direction toward the interior of the guide conduit so that by the contact of the guide conduit in its longitudinal direction with the cable receptacle, said protrusions can be moved from their inwardly protruding first position to their second position in which they do not protrude inwards if the respective other protrusion is not contacted by the cable receptacle.

With the support device which is known from the above-mentioned document, the upper strand of the cable receptacle is supported and guided punctually at two respective opposite positions. Such a support device is particularly suitable for vertically movable cable receptacles in which vibrations of the strand which is connected to the movable connecting point and clashing of the strands shall be avoided. In horizontally movable and/or heavier cable receptacles, a more stable and safer support and guidance of the upper strand are desired.

A support device for the upper strand of a cable receptacle is also known for instance from DE 23 620 463 A1. The mechanism proposed in this document and which is effective between the gripper arms, which can pivot in the transverse direction and which grip under the upper strand, and the switching rockers, is relatively complicated and expensive. For guiding the upper strand and the lower strand laterally, separate tub portions are respectively provided on a supporting structure.

A further support device for the upper strand of a cable receptacle is disclosed in U.S. Pat. No. 4,129,277 A1. This device includes L-shaped supports having a long leg and a short leg arranged for pivoting about an axis in the region of the transition between the two legs transversely to the longitudinal direction of the cable receptacle. On the free ends of the long legs at the side facing the respective shorter leg, rollers are supported which include a bearing surface for supporting the upper strand of the cable receptacle, and a flange part for laterally guiding the upper strand on the side pointing to the long leg. From an outwardly tilted position of the L-shaped supports, in which they do not impede the movement of the cable receptacle through and between them, as a result of the lower strand being supported on the short legs which point to each other, said supports are erected into a position in which the rollers are effective for supporting and guiding the upper strand. If during the returning movement of the lower strand the short legs are no longer loaded by the weight of the lower strand, the L-shaped supports are moved back to the outwardly inclined position with the aid of spring forces. To make sure that the supports are pivoted apart and outwards, shackles are provided about the rollers in the longitudinal direction of the cable receptacle, and the redirection bow of the cable receptacle can strike against these shackles and thus cause the supports to be pivoted apart.

However, in this known device the support of the lower strand of the cable receptacle only takes place by the approximately linear contact area with the rollers. A lateral guidance of the upper strand is also limited to the contact areas on the flange parts of the rollers. The support and guidance are dependent on whether the supports are maintained in the vertically erected position due to the weight of the lower strand of the cable receptacle resting on the short leg. In relatively fast moving cable receptacles, vertically upwardly directed forces can be exerted on the lower strand as a result of vibrations so that a safe support and lateral guidance of the upper strand cannot always be guaranteed.

The present invention is based on the object of improving a guide conduit of the kind described at the beginning in such a manner that the upper strand of a low-wearing cable receptacle can be safely and stably guided in a sliding fashion using simple means.

SUMMARY

According to the invention, this object is achieved by a guide conduit of the kind described above being designed as an essentially flat running surface on the top side of the body and by the body being movable from the second position in which the support device does not protrude significantly over the inner lateral surface of the respective side wall, to the first position in which the support device protrudes into the interior of the guide conduit with respect to the lateral surface, solely by gravity and/or by spring force, and the body in the first position extending through an opening in the respective lateral wall of the guide conduit.

By the fact that the support device according to the invention is formed on the switching device which causes pivoting of the support device from the second to the first position, a simple construction for producing the coupling between the switching and the support devices is achieved. The substantially flat running surface for the upper strand of the cable receptacle formed on the top side of the body of the switching device provides for the respective strand being stably and reliably guided in a sliding and thus low-abrasion and low-wearing manner.

In a preferred embodiment, the body is partly formed in a truncated cone shape, with the axis of symmetry extending vertically to the respective lateral surface, the top side including a horizontally extending flattening that forms the running surface. The flat running surface is preferably arranged in the central part of the width of the body.

The flattening should extend at minimum over half of the width of the body in the longitudinal direction. Particularly preferably, the flattening extends over at least ⅔ of the width of the body.

In the downwardly pointing part of the body, the same can be cut off also over the width of the flattening of the top side. Essential for the invention is that on both sides of the body which point in the longitudinal direction, concavities or surfaces which are inclined towards the pivot arm are provided which cause the body to be pivoted outwards to the second position as a result of the contact with inner and outer regions of the redirection bow of the cable receptacle.

A preferred improvement of the body geometry provides that the substantially flat running surface on the top side of the body continuously merges into the adjacent areas of the body surface in a curved manner.

To guarantee reliable pivoting of the body between the first and second positions, the pivot axis of the pivot arm is preferably arranged in the longitudinal direction of the guide conduit outside of the respective lateral surface and below the body. The position of the center of gravity of the body, especially in the outwardly tilted second position with respect to the pivot axis, is such that the body is pivoted to a first position protruding into the interior of the guide conduit solely by gravity and/or, if need be, by a supporting spring force, if the body is not contacted by the cable receptacle in the interior of the guide conduit.

In a different embodiment, the pivot axis can also be arranged above the body in order to guarantee the above-described secure pivoting of the body from the second position to the first position. However, for space-saving reasons, the arrangement of a pivot arm and a pivot axis above the running surface of the body and the opening provided for this purpose in the corresponding lateral wall may be unfavorable.

In a preferred further development of the invention, a roller is arranged in the body for rotation about an axis running vertically to the respective lateral wall, and the running surface on the top side of the body has an opening for the passage of a part of the roller surface so that this part together with the running surface on the top side of the body forms a substantially continuous running surface for the upper strand of the cable receptacle.

The body can be designed as a housing which is disposed around the circumference of the roller. The geometry of the housing can be chosen as described above with regard to the body.

The housing can be open in the region of the inwardly facing front face of the roller and can protrude over this front face.

Further, the rim of the housing pointing to the interior of the guide conduit can be provided with a curvature towards a plane running parallel to the front face of the roller.

In a preferred further development of the invention, the lateral walls of the guide conduit are plate-shaped. For reasons of stability, the lateral walls are preferably made of metal. Plastic plates can also be considered where appropriate.

The lateral walls can include plate-shaped supporting walls arranged laterally of the openings for the support device and extending transversely to the longitudinal direction of the guide conduit and outwardly, the pivot arms for the support device being formed by two legs fixed laterally on the support device and pivotably supported at their free ends on the supporting walls.

The bottoms of the supporting walls and the bottom of each lateral wall can be connected to each other by a bottom plate.

The respective opposite lateral walls can be connected to each other by a bottom cross member including on its top side a supporting surface for the lower strand of the cable receptacle.

In an advantageous design of the invention, the guide conduit can comprise several oppositely arranged lateral walls which are spaced from each other in the longitudinal direction and each of which includes a body comprising the support device and the switching device.

In this embodiment, the lateral walls each extend between their supporting walls. The lateral walls together with their supporting walls can be molded parts, with the lateral walls merging into their lateral supporting walls via inclined or curved regions.

In the guide conduit which consists of several longitudinally spaced lateral walls, a guide side member with legs arranged in an L-shape is preferably arranged on each side, one leg extending along the insides of the lateral walls and the other leg extending along the bottom cross members and the legs forming lateral guide or supporting surfaces for the lower strand of the cable receptacle.

FIGURES

Figure 7:
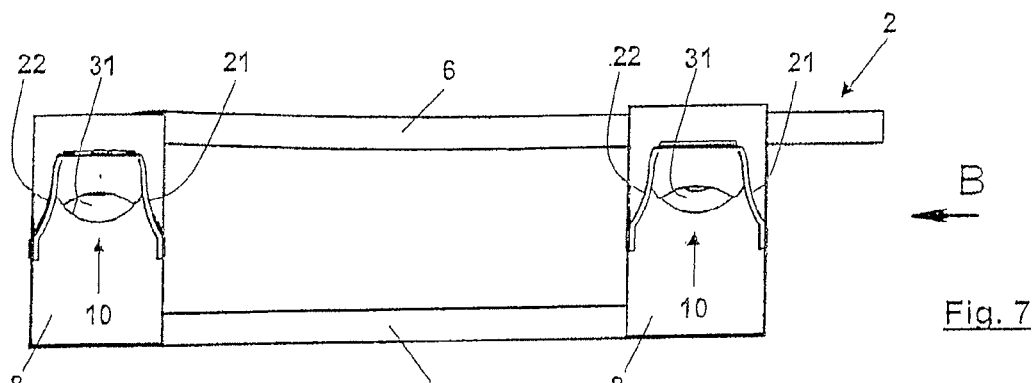
Figure 8:
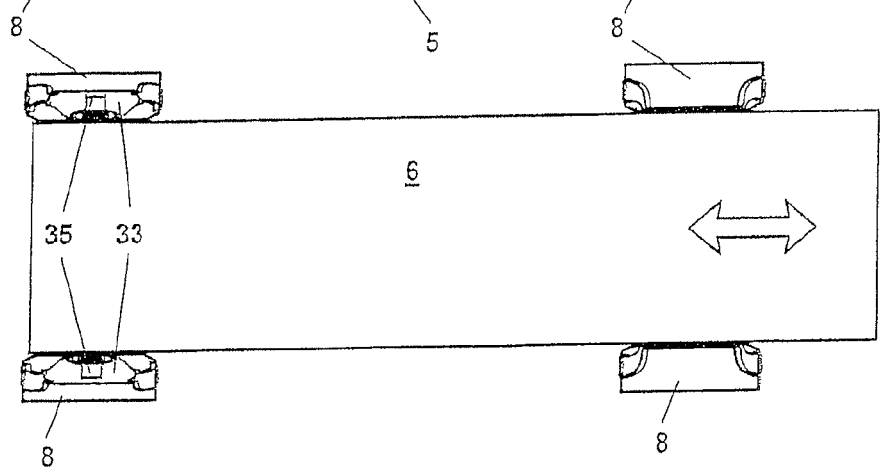
Figure 9:
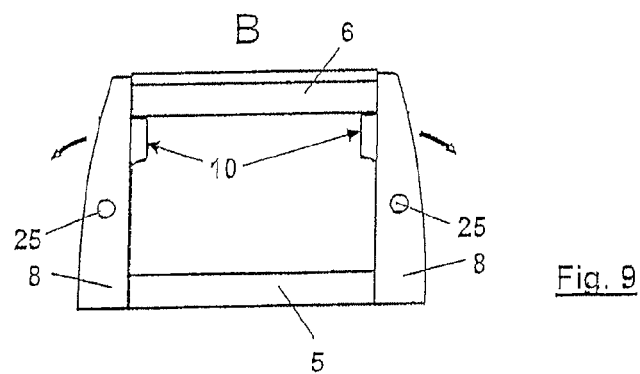

Two embodiments of the invention will be described in more detail in the following with reference to the attached drawings wherein it is shown by:

FIG. 1 a perspective view of a guide conduit with a cable receptacle arranged therein, in three different possible traveling positions;

FIG. 2 a perspective view of a first embodiment of a side member of the guide conduit illustrated in FIG. 1, viewed from the interior of the guide conduit;

FIG. 3 a perspective view of the embodiment of the side member illustrated in FIG. 2, viewed from outside of the guide conduit;

FIG. 4 a perspective view of a second embodiment of a side member of a guide conduit, viewed from the interior of the guide conduit;

FIG. 5 a perspective view of the embodiment of the side member of the guide conduit illustrated in FIG. 4, viewed from outside of the guide conduit;

FIG. 6 a perspective view to a section of a guide conduit including the side members illustrated in the FIGS. 4 and 5;

FIG. 7 a lateral view of the section of the guide conduit illustrated in FIG. 6;

FIG. 8 a top view of the section of the guide conduit illustrated in FIG. 6; and FIG. 9 a front view in the direction of arrow B in FIG. 7.

DETAILED DESCRIPTION

FIG. 1 shows a guide conduit 1 for a cable receptacle 2 which extends between a stationary connecting point 3 and a movable connecting point 4 and consists of a lower strand 5 connectible to the stationary connecting point 3 and an upper strand 6 connectible to the movable connecting point 4, both strands 5 and 6 being connected to each other by a redirection bow 7.

The guide conduit 1 consists of a plurality of pairs of side members 8 arranged oppositely to each other transversely to the longitudinal direction of the guide conduit. The side members 8 are shown in detail in two different embodiments in the FIGS. 2 and 3 respectively 4 and 5.

As generally shown by FIG. 1, the side members 8 have inner lateral surfaces 9 for the contact with lateral regions of the two strands 5 and 6, and support devices 10 for supporting and guiding the upper strand 6 at a vertical distance to the lower strand 5 and beyond the stationary connecting point 3 of the lower strand 5.

In FIG. 1, three different traveling positions of the cable receptacle in the left, middle and right region are shown. In the right region, the cable receptacle 2 has reached its furthest traveling position in the respective direction so that it merges from the movable connecting point 4 into the redirection bow 7 and into the maximally extended lower strand 5. The lower strand 5 is supported over its entire length in guide side members 11 arranged on both sides of the guide conduit 1. The guide side members 11 have L-shaped legs, one leg extending along the inner sides of the side members 8 and the other leg extending along the bottom cross members 12 that extend between the opposite side members 8, and the legs forming lateral guide or supporting surfaces for the lower strand 4 of the cable receptacle.

Outside of the area in which the upper strand 6 is to be supported and in which the side members 8 with the support devices 10 are arranged (approximately the central area in FIG. 1), the guide side members 11 are fixed to oppositely arranged side member holders 13 and to bottom plates 12 (right area in FIG. 1) connecting the same.

If the movable connecting point 4 together with the cable receptacle 2 connected to it is moved from the maximum position shown on the right in FIG. 1 to the left, as illustrated further in the center of FIG. 1, the upper strand 6 can be supported between the side members 8 on the support device 10. In the position illustrated in FIG. 1, the redirection bow is on the right side outside of the first pair of opposite side members 8. If the cable receptacle 2 is moved further to the left, the redirection bow 7 will contact the support devices 10 protruding into the interior of the guide conduit between the opposite side members 8. Due to a special design of the support devices 10 which will be described in more detail in the following with reference to the FIGS. 2 and 3 respectively 4 and 5, upon contacting the redirection bow 7, the support devices are pivoted from their inwardly protruding first position in which they effectuate the support of the upper strand 6, outwards to a second position in which they do not significantly protrude inwardly over the inner lateral surfaces 9 of the corresponding side members 8 and do not impede the continued traveling of the cable receptacle 2 to the left in FIG. 1.

After the redirection bow 7 has passed between two opposite side members 8, a mechanism which is described in the following with reference to the FIGS. 2 and 3, causes the support devices 10 to be pivoted from their second position back again to their first position.

In the position of the cable receptacle 2 illustrated on the left in FIG. 1, the movable connecting point 3 has reached its furthest position on the left of the stationary connecting point 3. The redirection bow 7 immediately joins the stationary connecting point 3, and the entire upper strand requires support by pairs of oppositely arranged side members 8 and by the support devices 10 arranged thereon.

If the cable receptacle 2 is moved from this position to the right again, the redirection bow 7 and the support device once again contact each other at the pairs of side members 8 arranged to the right of the redirection bow 7. By the mechanism described in the following, the support devices 10 are pivoted upon this contact from the first position in which they protrude between the respective side members 8, again outwardly to their second position in which they do not significantly protrude over the inner lateral surfaces 9 of the side members 8 and in which they do not impede the redirection bow 7 in traveling to the right between and through the side members 8.

As shown by the FIGS. 2 and 3, the supporting device 10 for the upper strand of the cable receptacle is designed as a substantially flat running surface 14 on the top side of a body 15, which in a first position in which the supporting device 10 protrudes into the interior of the guide conduit with respect to the lateral surface 9 of the side member 8, extends through an opening 16 in the lateral wall of the side member 8.

The body 15 is partly in the form of a truncated cone, with the axis of symmetry running vertically to the respective lateral surface 9, and includes a flattening forming the running surface 14. The flattening extends in the central region of the body approximately over three quarters of its width in the horizontal direction. In the downwardly pointing region of the body 15, the same is also cut off over approximately the width of the flattening. It is important that on both sides of the body 15 pointing in the horizontal direction, surfaces 18 and 19 are provided which are inclined towards the lateral surface 9. These surfaces 18 and 19 come into contact with inner and outer regions of the redirection bow 7 of the cable receptacle and, as described in the following with reference to FIG. 3, cause the body 15 to be pivoted from the first position shown in FIG. 2 to the second position in which the body does not longer protrude to a significant extent over the inner lateral surface 9 of the lateral wall 17.

As shown by FIG. 3, the body 15 is pivotably supported on a pivot arm 20 outside of the inner lateral surface of the lateral wall 17. The pivot arm 20 has two legs 21 and 22 which are pivotably supported at their free ends on supporting walls 23 respectively 24. The pivot axis extends in the longitudinal direction of the guide conduit below the body 15 and with a distance to the lateral wall 17. To support the legs 21 and 22 for pivoting, they have outwardly protruding joint bolts 25 that are supported in corresponding joint openings in the supporting walls 23 respectively 24. For inserting the joint bolts 25 in the joint openings, the legs 21 and 22 of the pivot arm 20 are slightly pressed together so that the joint bolts 25 can snap into place in the joint openings.

The position of the center of gravity of the body 15 relative to the pivot axis is such that especially in the second position in which the body 15 is pivoted outwards to an extent that it does no longer protrude at the lateral surface 9 of the lateral wall 17, the body is pivoted to the first position shown in the FIGS. 2 and 3 in which it protrudes into the interior of the guide conduit solely by its weight, if it is not contacted by the redirection bow of the cable receptacle in the interior of the guide conduit. For limiting the pivoting angle outwards and for assisting the pivoting action directed inwardly, a rod spring 26 arranged on the outside of the lateral wall 17 is used.

FIG. 3 also shows that the bottoms of the supporting walls 23 and 24 and the bottom of the lateral wall 17 are connected to each other by a bottom plate 27. The lateral wall 17 with the lateral supporting walls 23 and 24 and the bottom plate 27 is provided in the form of a molded metal part, with the lateral wall 17 merging into the supporting walls 23 and 24 via inclined regions 28 and 29.

The FIGS. 4 and 5 show a second embodiment of a support device 10 in which the body 15 is designed in such a manner that it includes a roller 31 disposed inside a housing 30. The roller 31 is supported about an axis 32 extending vertically to the lateral wall 17. The housing 30 has on the top side thereof a flattening 33 which partly forms the running surface 14 of the body 15 in FIG. 2 and which is provided with an opening 34 in the central part thereof through which a part 35 of the roller surface passes. This part 35 together with the flattening 33 of the housing 30 forms a substantially continuous running surface for the upper strand of the cable receptacle.

The further geometry of the housing 30 corresponds to that of the body 15 in FIG. 2. The housing 30 is open in the region of the inwardly pointing front face of the roller 31 and slightly protrudes over the front face in order to protect the roller 31. The rim of the housing pointing to the interior of the guide conduit and surrounding the opening is provided with a flattening into a plane extending parallel to the front face of the roller 31. The flattening 33 on the top side of the housing also merges substantially continuously into the lateral surfaces 18 and 10 by a flattening so that dirt which possibly accumulates on the running surface can better slide off laterally, without excessive abrasion of the upper strand running on the running surface.

FIG. 6 once again shows a section of the guide conduit 1 in which a part of the upper strand 6, the redirection bow 7 and a part of the lower strand 5 of the cable receptacle 2 are located. The section of the guide conduit 1 consists of two pairs of opposite side members 8 which correspond to the embodiment illustrated in the FIGS. 4 and 5.

In the pair of side members 8 shown on the right in FIG. 6, the support device 10 is in the first position protruding into the interior of the guide conduit 1 for supporting the upper strand 2. In the pair of side members 8 shown on the left in FIG. 6, the support device 10 is in the outwardly pivoted second position in which it is contacted by regions of the redirection bow 7 of the cable receptacle 2. Before and after the contact by respective regions of the redirection bow 7, the support devices 10 are pivoted to their first position like those of the side members 8 shown on the right in FIG. 6, and are effective for supporting the upper strand 6 among the two strands.

FIG. 7 shows a lateral view of the section of the guide conduit 1 shown in FIG. 6 from the right, and FIG. 8 is a top view which illustrates once again the different pivoting positions of the support devices 10 and the side members 8.

FIG. 9 shows a front view in the direction of arrow B in FIG. 7, the lateral arrows 36 showing the pivoting directions of the opposite support devices 10 from the first position supporting the upper strand 2 to the second position unblocking the travelling path of the redirection bow 2.

LIST OF REFERENCE NUMBERS 1 guide conduit
2 cable receptacle
3 stationary connecting point
4 movable connecting point
5 lower strand
6 upper strand
7 redirection bow
8 side member
9 lateral surface
10 support device
11 guide side member
12 bottom cross member
13 side member holder
14 running surface
15 body
16 opening
17 lateral wall
18 surface
19 surface
20 pivot arm
21 leg
22 leg
23 support wall
24 support wall
25 pivot pin
26 rod spring
27 bottom plate
28 inclined region
29 inclined region
30 housing
31 roller 32 axis
33 flattening
34 opening
25 part
36 arrow

The invention claimed is:

1. Guide conduit for a cable receptacle which extends between a stationary connecting point and a movable connecting point and which consists of a lower strand connectible to the stationary connecting point and an upper strand connectible to the movable connecting point, the strands being connected to each other by a redirection bow, wherein the guide conduit includes two opposite vertically fixed lateral walls with inner lateral surfaces for the contact with lateral regions of the two strands, and wherein at least one support device for supporting and guiding the upper strand is arranged on each of the opposite lateral walls and is movable between a first position in which it protrudes into the interior of the guide conduit with respect to the lateral surface and acts as a support of the upper strand, and a second position in which it does not protrude significantly over the inner lateral surface of the respective lateral wall and does not act as a support of the upper strand, and wherein the guide conduit includes a switching device in the form of a body that can be moved into the path of travel of the cable receptacle, the body being supported for pivoting on a pivot arm outside of the inner lateral surface of the respective lateral wall and being enlarged outwardly from the interior of the guide conduit on its two sides pointing in the longitudinal direction of the guide conduit and being movable by the contact of these sides with inner and outer regions of the redirection bow of the cable receptacle to a position in which it does not significantly protrude over the inner lateral surface of the respective lateral wall and in which it does not impede the continued travel of the cable receptacle, and being coupled to the support device in such a manner that the same is movable from one of the two positions to the other, characterized in that the support device is formed as a substantially flat running surface on the top side of the body and that the body is moved solely by its gravity and/or by spring force from the second position, in which the support device does not significantly protrude over the inner lateral surface of the respective lateral wall, to the first position in which the support device protrudes into the interior of the guide conduit with respect to the lateral surface, and the body in the first position extends through an opening in the respective lateral wall of the guide conduit.

2. Guide conduit according to claim 1, characterized in that body is partly formed as a truncated cone with the axis of symmetry extending vertically to the respective lateral surface, the top side including a horizontally extending flattening that forms a running surface.

3. Guide conduit according to claim 2, characterized in that the flattening extends at least over the half of the width of the body in the longitudinal direction.

4. Guide conduit according to claim 1, characterized in that the substantially flat running surface on the top side of the body continuously merges into the adjacent regions of the body surface in a two-dimensionally inclined or curved manner.

5. Guide conduit according to claim 1, characterized in that the pivot axis of the pivot arm is arranged in the longitudinal direction of the guide conduit outside of the respective lateral surface and below the body.

6. Guide conduit according to claim 1, characterized in that in the body a roller is arranged which is rotatable about an axis extending vertically to the respective lateral wall, the running surface on the top side of the body having an opening for the passage of a part of the roller surface so that this part together with the running surface on the top side of the body forms a substantially continuous running surface for the upper strand of the cable receptacle.

7. Guide conduit according to claim 6, characterized in that the body is formed as a housing arranged around the circumference of the roller.

8. Guide conduit according to claim 7, characterized in that the housing is open in the region of the inwardly facing front side of the roller and protrudes over this front side.

9. Guide conduit according to claim 7, characterized in that rim of the housing pointing to the interior of the guide conduit is provided with an inclined surface or with a curvature with respect to a plane running parallel to the front side of the roller.

10. Guide conduit according to claim 1, characterized in that the lateral walls of the guide conduit are plate-shaped.

11. Guide conduit according to claim 1, characterized in that the lateral walls include plate-shaped supporting walls disposed laterally of the openings for the support device and extending outwardly and transversely to the longitudinal direction of the guide conduit, the pivot arms for the support device being formed by two legs which are laterally fixed on the supporting device and which are pivotably supported at the free ends thereof on the supporting walls.

12. Guide conduit according to claim 11, characterized in that the bottoms of the supporting walls and the bottom of each lateral wall are connected to each other by a bottom plate.

13. Guide conduit according to claim 1, characterized in that the respectively opposite lateral walls are connected to each other by a bottom cross member.

14. Guide conduit according to claim 1, characterized in that it comprises several mutually opposite lateral walls spaced from each other in the longitudinal direction, each with a body which comprises the support device and the switching device.

15. Guide conduit according to claim 14, characterized in that the lateral walls each extend between their supporting walls.

16. Guide conduit according to claim 15, characterized in that the lateral walls merge into their lateral supporting walls via inclined or curved regions.

17. Guide conduit according to claim 14, characterized in that in its region in which the upper strand of the cable receptacle can be supported, the guide conduit comprises on each side thereof a guide side member with legs arranged in an L-shape, one leg extending along the inside of the lateral walls and the other leg extending vertically to the lateral walls and into the interior of the guide conduit, and the legs forming lateral guide or support surfaces for the lower strand of the cable receptacle.

* * * * *